US012596030B2

(12) United States Patent
Cavallaro et al.

(10) Patent No.: US 12,596,030 B2
(45) Date of Patent: Apr. 7, 2026

(54) VIBRATION SENSOR AND METHODS FOR DEPOSITION MONITORING

(71) Applicant: General Electric Company,
Schenectady, NY (US)

(72) Inventors: Stephanie Cavallaro, Mechanicville,
NY (US); Don M. Lipkin, Schenectady,
NY (US); Andrew Lee Trimmer,
Niskayuna, NY (US)

(73) Assignee: General Electric Company,
Schenectady, NY (US)

( * ) Notice: Subject to any disclaimer, the term of this
patent is extended or adjusted under 35
U.S.C. 154(b) by 369 days.

(21) Appl. No.: 18/221,246

(22) Filed: Jul. 12, 2023

(65) Prior Publication Data

US 2025/0020506 A1     Jan. 16, 2025

(51) Int. Cl.
*G01H 13/00*          (2006.01)
*G01B 5/06*           (2006.01)
*G01B 7/06*           (2006.01)
*G01B 17/02*          (2006.01)

(52) U.S. Cl.
CPC .................................. *G01H 13/00* (2013.01)

(58) Field of Classification Search
CPC ...... G01H 13/00; G01B 7/066; G01B 17/025;
G01B 5/066
See application file for complete search history.

(56) References Cited

U.S. PATENT DOCUMENTS

| | | |
|---|---|---|
| 4,980,674 A | 12/1990 | Scheibel |
| 5,969,235 A | 10/1999 | Allan |

| | | |
|---|---|---|
| 6,482,649 B1 | 11/2002 | Gogol, Jr. |
| 6,643,952 B2 | 11/2003 | Murphy |
| 6,701,787 B2 | 3/2004 | Han |

(Continued)

FOREIGN PATENT DOCUMENTS

| | | |
|---|---|---|
| FR | 3129428 | 5/2023 |
| FR | 3129436 | 5/2023 |

(Continued)

OTHER PUBLICATIONS

3D Optical Profilometer, VR-6000 Series, Keyance, catalogue available at https://www.keyence.com/products/microscope/macroscope/vr-6000/?search_sl=1; 36 pgs.; Believed to be publicly available at least as of Jul. 11, 2023.

(Continued)

*Primary Examiner* — Laura Martin

*Assistant Examiner* — Anthony W Megna Fuentes

(74) *Attorney, Agent, or Firm* — Smith, Gambrell & Russell, LLP

(57)          ABSTRACT

Apparatuses and methods are provided herein that are useful to monitoring a coating deposition process. In some embodiments, a method of monitoring a coating process for a target object involves applying a coating to at least a portion of a beam during at least part of a coating deposition process to obtain a coated beam. The method also includes exciting the coated beam such that the coated beam vibrates. The method also includes monitoring the vibration response of the coated beam and determining at least one of a deposition rate or a drying rate for the target object based on the change in the frequency response of the coated beam.

24 Claims, 11 Drawing Sheets

(56)                     References Cited

U.S. PATENT DOCUMENTS

| | | | |
|---|---|---|---|
| 7,784,346 B2 | 8/2010 | Williams | |
| 9,121,754 B2 | 9/2015 | Hines | |
| 9,417,216 B2 | 8/2016 | Kim | |
| 9,764,415 B2 | 9/2017 | Seufzer | |
| 11,385,045 B2 | 7/2022 | Bourne | |
| 2006/0223171 A1* | 10/2006 | Craighead ........... | G01N 29/022 |
| | | | 435/287.2 |
| 2017/0241776 A1 | 8/2017 | Gang | |

FOREIGN PATENT DOCUMENTS

| | | |
|---|---|---|
| FR | 3129690 | 6/2023 |
| FR | 3129970 | 6/2023 |
| FR | 3129972 | 6/2023 |
| FR | 3130747 | 6/2023 |
| FR | 3130874 | 6/2023 |
| FR | 3130895 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

OTHER PUBLICATIONS

Handhled Probe Coordinate Measuring Machine (CMM), XM-5000, Keyance, catalogue available at https://www.keyence.com/products/ measure-sys/cmm/; 36 pgs. ; Believed to be publicly available at least as of Jul. 11, 2023.

* cited by examiner

Base

Cover

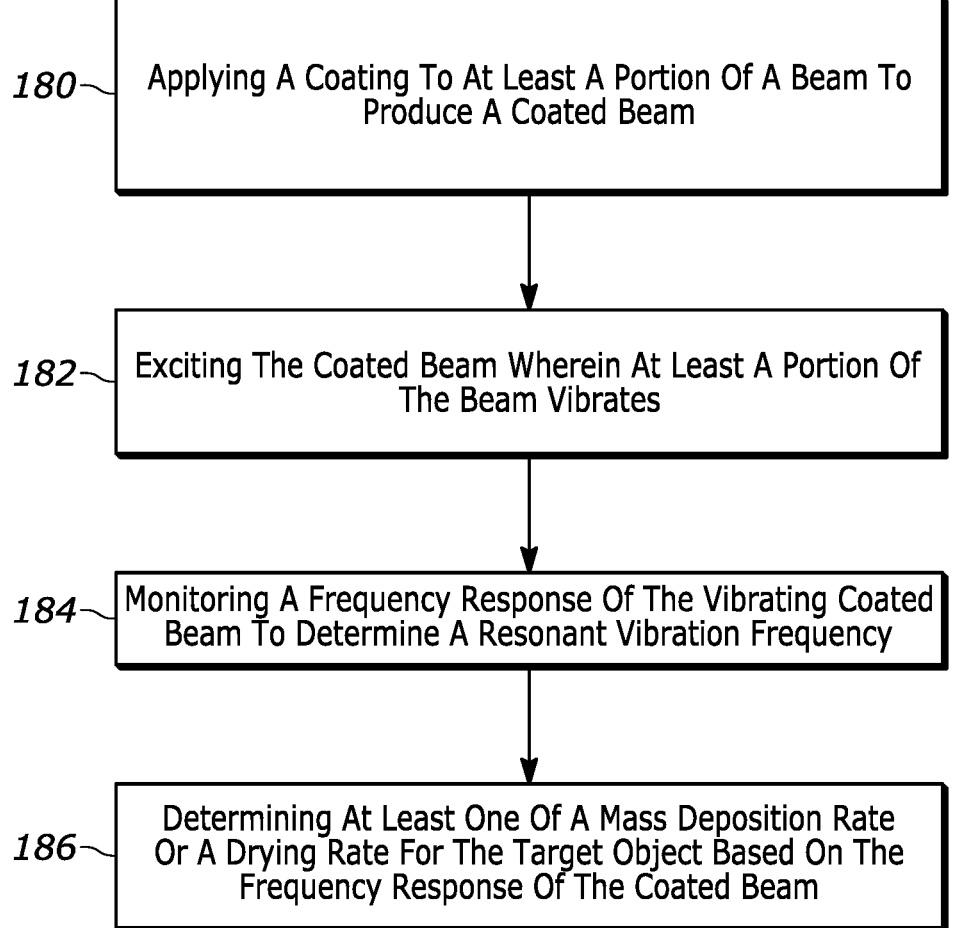

*180*~ Applying A Coating To At Least A Portion Of A Beam To Produce A Coated Beam

*182*~ Exciting The Coated Beam Wherein At Least A Portion Of The Beam Vibrates

*184*~ Monitoring A Frequency Response Of The Vibrating Coated Beam To Determine A Resonant Vibration Frequency

*186*~ Determining At Least One Of A Mass Deposition Rate Or A Drying Rate For The Target Object Based On The Frequency Response Of The Coated Beam

FIG. 8

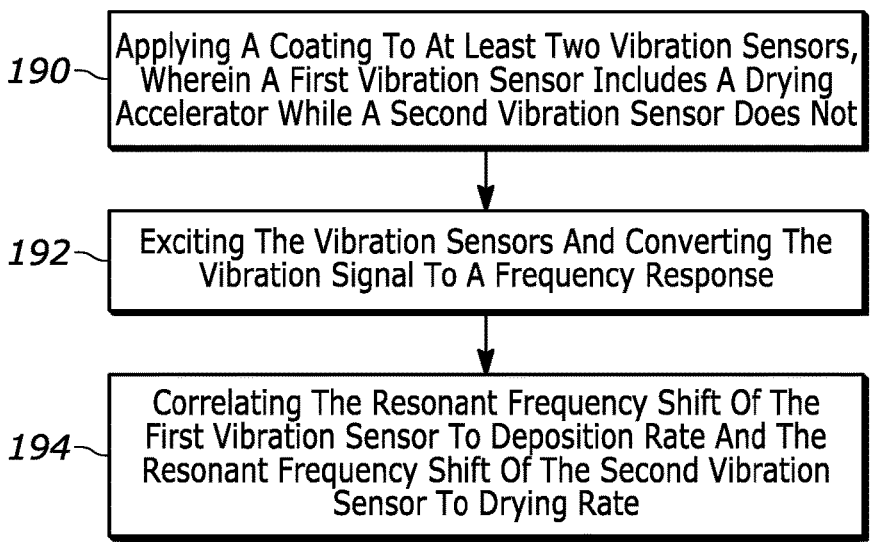

190 — Applying A Coating To At Least Two Vibration Sensors, Wherein A First Vibration Sensor Includes A Drying Accelerator While A Second Vibration Sensor Does Not 192 — Exciting The Vibration Sensors And Converting The Vibration Signal To A Frequency Response 194 — Correlating The Resonant Frequency Shift Of The First Vibration Sensor To Deposition Rate And The Resonant Frequency Shift Of The Second Vibration Sensor To Drying Rate

FIG. 9

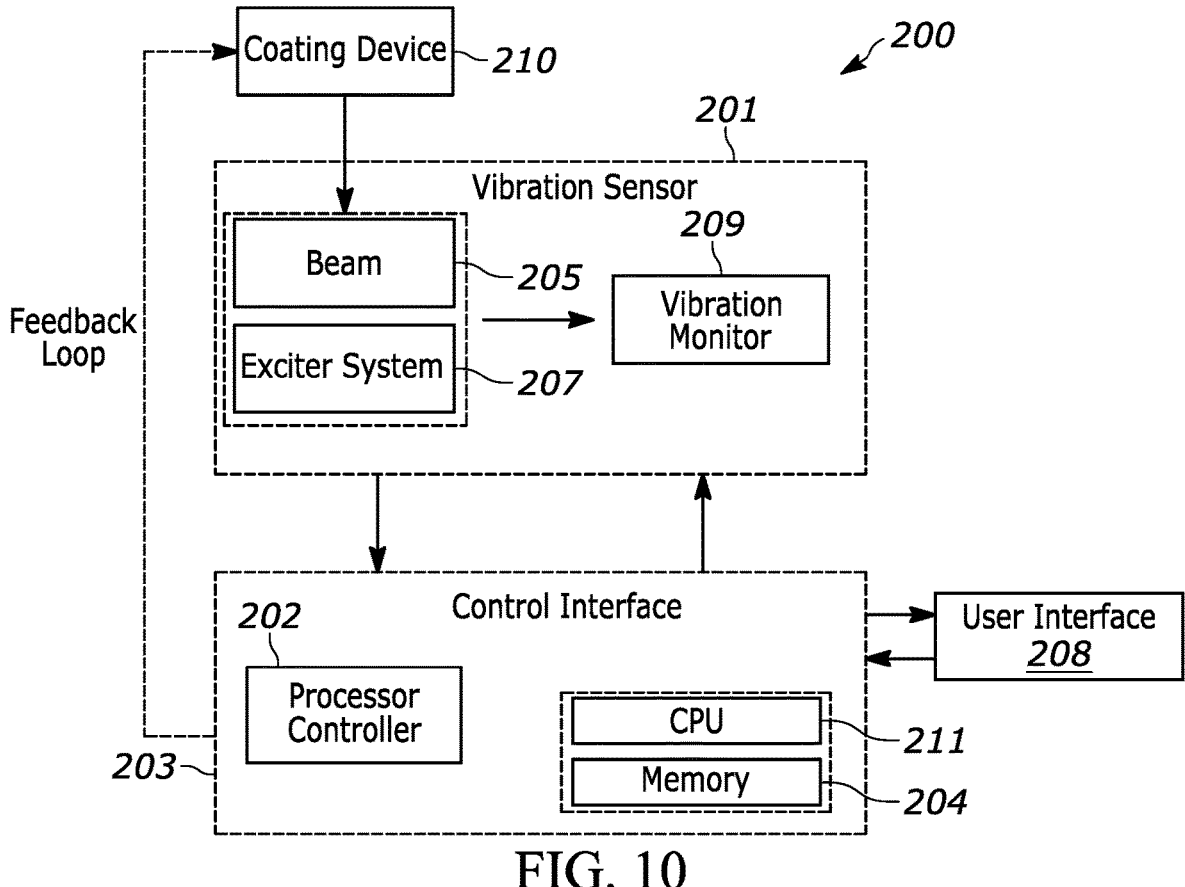

FIG. 10

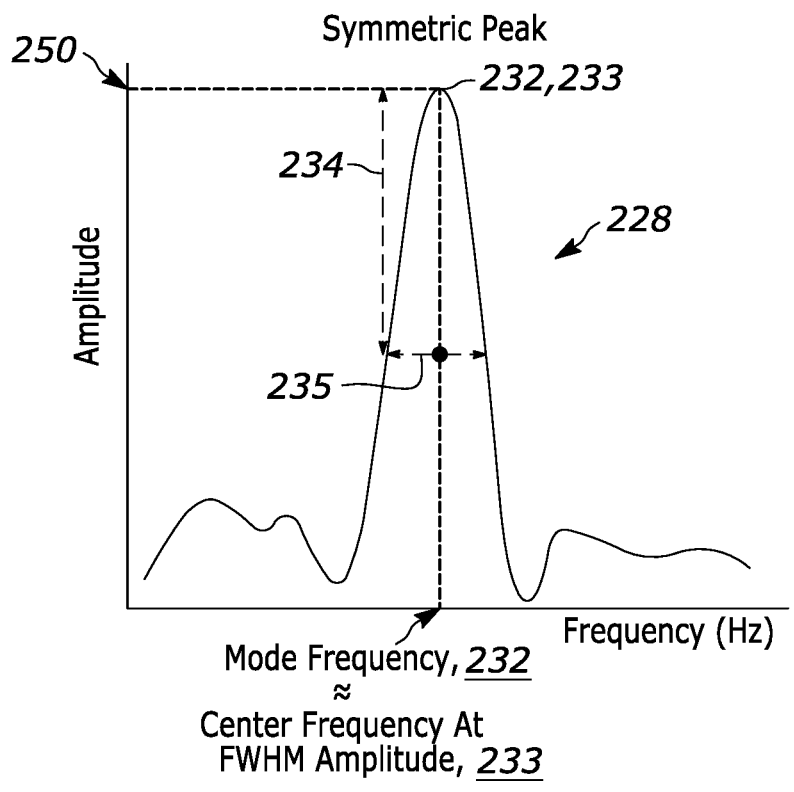
Symmetric Peak
Mode Frequency, *232*
≈
Center Frequency At
FWHM Amplitude, *233*
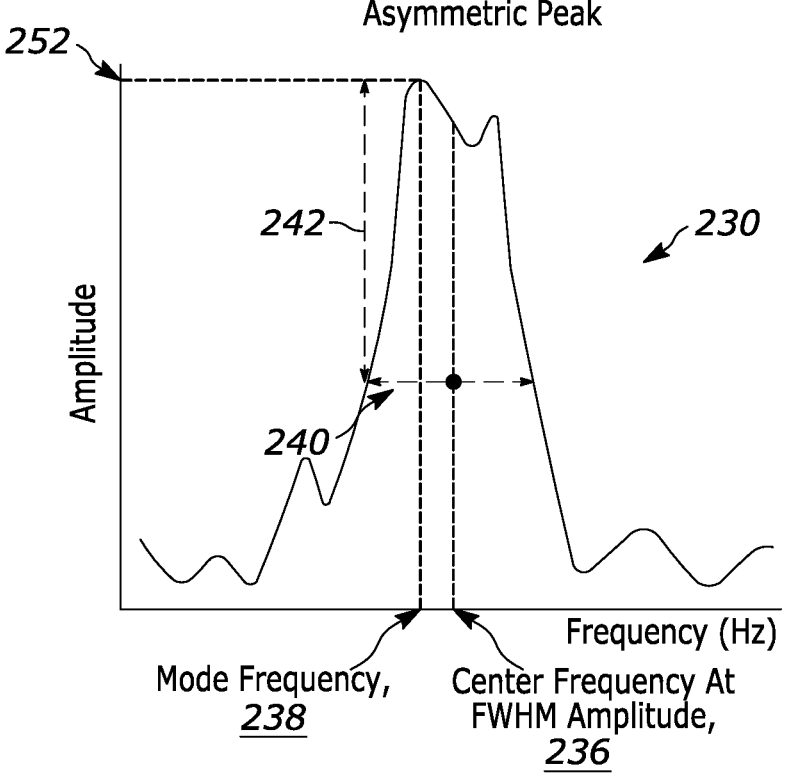
Asymmetric Peak
Mode Frequency,
*238*
Center Frequency At
FWHM Amplitude,
*236*
FIG. 12

VIBRATION SENSOR AND METHODS FOR DEPOSITION MONITORING

TECHNICAL FIELD

These teachings relate generally to coating deposition and more particularly to monitoring devices for coating deposition.

BACKGROUND

Components, such as parts for gas turbine engines, may operate in environments that are exposed, for example, to extreme temperatures and pressures. As such, various components of gas turbine engines may be coated to modify the surface properties of the substrate material. Such coatings may be applied to components via a deposition process. In some approaches, the coatings are slurry-sprayed coatings such as paints.

BRIEF DESCRIPTION OF THE DRAWINGS

Various needs are at least partially met through provision of the vibration sensor for deposition monitoring described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which:

FIG. 8 comprises a flow diagram of a method of determining a drying rate or a deposition rate for a coating;

FIG. 9 comprises a flow diagram of a method of monitoring coating deposition, in accordance with some embodiments;

FIG. 10 comprises a block diagram of an exemplary system, in accordance with some embodiments;

FIG. 12 comprises graphs illustrating exemplary analysis of a frequency spectrum.

Figure 1:
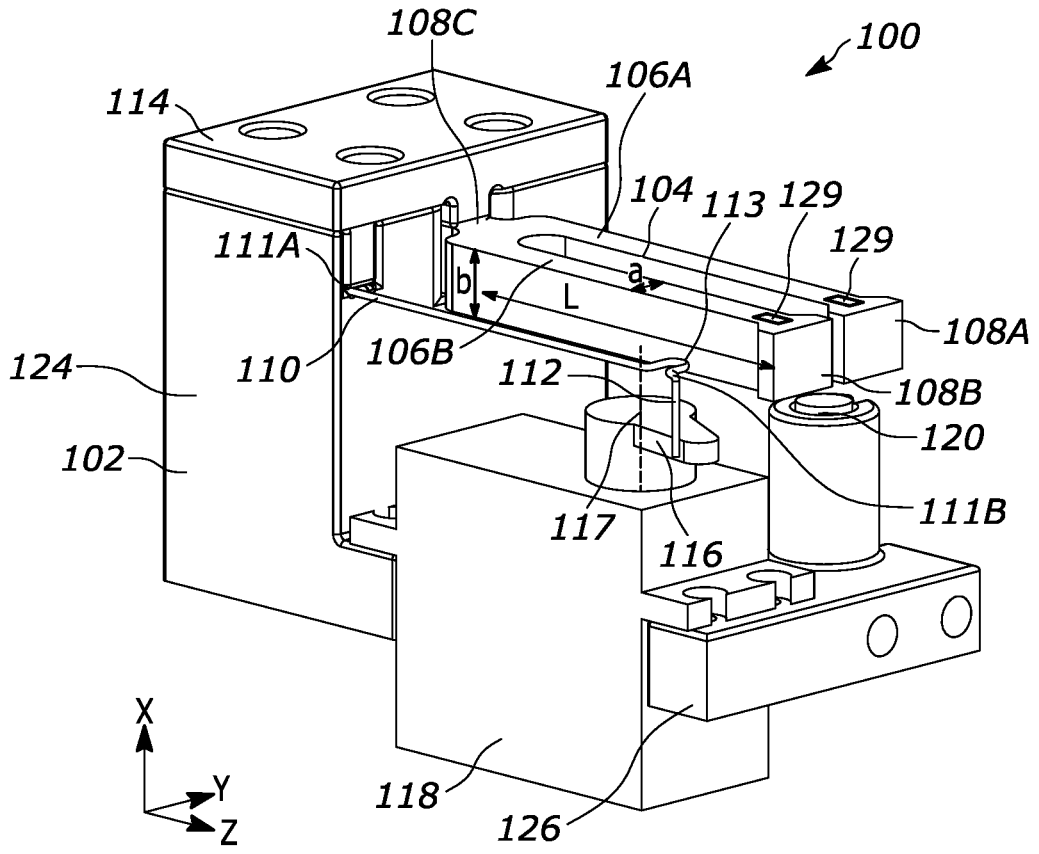
FIG. 1 comprises a perspective view of a vibration sensor for coating deposition monitoring, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

It may be desirable to monitor a deposition process so as to assess the deposition rate, the thickness of a deposit, and/or a state of dryness of the deposit on a target object. The target object may be any type of object and, in some approaches, is a part of a gas turbine engine such as a blade, nozzle, shroud, disk, combustion liner, combustion dome, exhaust transition piece, etc. Typically, monitoring a coating applied to a target object via a deposition process involves witness coupons or off-line examination of the target object. For example, the target object or a coupon may have to be examined by weighing, taking profilometric or caliper thickness measurements, and/or by metallographic cross-sectioning after the coating process is complete. Further, any solvent drying rates for a coating applied via a deposition process are typically determined by monitoring mass loss or empirically through smell or touch. These are all significant challenges, for example, in the context of high-rate production settings.

Generally, the vibration sensors and methods of the present disclosure may be employed to monitor the deposition process for a target object. In particular, the vibration sensors and methods described may measure the coating deposition rate and (for the case of a solvent- or other carrier-liquid based coating) drying rate. The vibration sensors and methods described herein may enable in-situ process monitoring of the deposition process to provide real-time tracking of the drying and deposition rates for the coating. Real-time process monitoring may also enable process control based on real-time data. In particular, the vibration sensors and methods described herein exploit the mass-dependence of the resonant frequencies of vibrating beams, such as a tuning fork. The mass-dependance of the resonant frequency of a vibrating beam allows a mass deposition rate and/or a drying rate to be directly measured. A corresponding thickness deposition rate may also be inferred from calibration of the mass deposition rate to the coating density.

In some aspects, a sensor apparatus in accordance with the teachings herein includes a beam having at least one deposition surface, wherein the resonant frequencies of the vibrating beam systematically respond to a mass applied to the at least one deposition surface via a coating deposition process. The beam has an excited state, during which at least a portion of the beam vibrates. The sensor apparatus further includes a vibration monitor that detects a frequency response of the beam in the excited state.

In some aspects, the coating deposition process applies a coating to a target object. A method of monitoring a deposition process includes applying a coating to at least a portion of a beam during at least part of a coating deposition process to obtain a coated beam. The method also includes exciting the coated beam to an excited state. In the excited state, at least a portion of the beam vibrates. The method also includes monitoring a frequency response of the excited beam. The method further includes determining at least one of a deposition rate or a drying rate for the target object based on the frequency response of the excited beam.

In some aspects, a method of monitoring coating deposition includes applying a coating to at least two beams positioned proximate to a target object during the coating deposition process. At least one of the beams has a heater to accelerate drying. The method includes exciting the beams and monitoring a frequency response of the beams. The method then includes determining a mass deposition rate for the target object based on the frequency response of the heated beam and determining a drying rate for the target object based on the frequency response of the unheated beam. Alternative methods may accelerate drying of the coating using non-heating means, such as using unheated air convection.

The vibration sensors described herein may be configured to sense vibrations of an excited beam via optics (e.g., via a laser), capacitance (via a capacitance gauge), piezoelectricity (e.g., via a piezoelectric transducer), and/or strain (e.g., via a strain gauge), or other known means of measuring vibration. In one non-limiting example, the vibration sensor described herein may employ an acoustic monitor such as a microphone to detect vibrations of a beam. In another non-limiting example, the vibration sensor described herein may employ an optical detector to sense vibrations of an excited beam.

It is contemplated that the vibration sensors and methods described herein may be applied to monitor any coating deposition process and any coating type. In some approaches, the vibration sensors and methods may be applied to monitor a liquid carrier-based coating, such as a slurry-sprayed coating.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description. Referring now to the drawings, and in particular to FIG. 1, a vibration sensor 100 that is compatible with many of these teachings is shown. The vibration sensor 100 includes a base 102. A beam 104, an exciter 110, a cover 114, an actuating arm 116, a motor 118, and a vibration monitor 120 are coupled to the base 102.

The base 102 includes a first leg portion 124 and a second leg portion 126. The beam 104 and the exciter 110 are coupled to the first leg portion 124 of the base 102. The cover 114 secures the beam 104 and the exciter 110 to the base 102. The motor 118, the actuating arm 116, and the vibration monitor 120 are coupled to the second leg portion 126 of the base 102.

As shown in FIG. 1, the beam 104 is cantilevered from the first leg portion 124 of the base 102. The beam 104 is formed of an elastic material and acts as an oscillator in response to an impulse created by the exciter 110. In this example, the beam 104 is a fork having a first tine 106A and a second tine 106B. The first tine 106A and the second tine 106B are coupled together or joined at a stem 108C that is coupled to the base 102. The first tine 106A includes a first deposition surface 108A. The second tine 106B includes a second deposition surface 108B. The first deposition surface 108A and the second deposition surface 108B are disposed at an end of the first tine 106A and the second tine 106B, respectively. A space separates the first deposition surface 108A from the second deposition surface 108B. In some approaches, the first deposition surface 108A has an area that is larger than a cross-section (a*b) of the first tine 106A. Similarly, the second deposition surface 108B may have an area that is larger than a cross-section of the second tine 106B. These larger areas may help to enhance capture efficiency of the coating on the first deposition surface 108A and the second deposition surface 108B, as well as reduce coating deposition on other surfaces of the beam 104.

In the embodiment depicted in FIG. 1, the beam 104 includes two tines. Alternatively, the beam 104 may include more than two tines or a single tine. For example, the beam 104 may be a single beam supported at its nodes. As used herein, a node of a beam refers to a location along the beam that experiences a minimum vibration amplitude when excited. For example, in the case of a tuning fork, a stem where the tines meet is a node. Though the vibration sensor 100 uses a tuning fork as the beam 104 in the exemplary embodiment depicted in FIG. 1, it is contemplated that the vibration sensor 100 may employ any suitable beam capable of being excited to vibrate at, at least, the resonant frequency.

In some approaches, the beam 104 is formed from a glass, a metal, and/or a ceramic material. In some examples, the beam 104 is formed from one or more of a fused quartz ($SiO_2$), aluminum, stainless steel, steel, silicon carbide, Invar alloy (Ni—Fe), tungsten, titanium, silicon nitride, silicon, or boron carbide material or similar. In some approaches, the beam 104 may be selected such that it is composed of a material having a Young's modulus, density, and/or geometry to produce a desired resonant frequency response. For example, it may be advantageous to have a geometrically compact beam that resonates in a frequency range that is conducive to monitoring with acoustic sensors and that has a strong or detectable frequency shift upon coating deposition.

The material of the beam 104 may be selected so as to minimize or reduce thermal expansion and/or to have high specific modulus (e.g., high stiffness to weight ratio). The material may also additionally be selected to reduce the vibration dampening (e.g., a high quality factor). In some approaches, the beam 104 may have a quality factor (sometimes referred to as a Q factor) greater than about 1000. In other approaches, the beam 104 may have a quality factor greater than about 10000. Table 1 below includes non-limiting examples of potential beam materials, taking into account the above considerations.

TABLE 1

| Beam Material | Specific Modulus, $E/\rho$ [m²/s²] | Thermal Expansion, CTE [ppm/° C.] | Quality Factor |
|---|---|---|---|
| Silicon Carbide, SiC | 1.28E+08 | 4 | 5E+04 to 9E+04 |
| Boron Carbide, B₄C | 2.05E+08 | 4.4 | 1E+04 to 1E+05 |
| Silicon Nitride, Si₃N₄ | 8.7E+07 | 2.6 | 8E+04 to 1E+05 |
| Silicon, Si | 4.35E+07 | 3.6 | 9E+04 to 5E+05 |
| Fused Quartz, (Silica) SiO₂ | 3.18E+07 | 0.56 | 2E+04 to 2E+05 |
| Invar, FeNi36 | 1.68E+07 | 1.8 | 1E+03 to 9E+03 |
| Steel | 2.59E+07 | 10.2 | 1E+03 to 9E+03 |
| Aluminum | 2.52E+07 | 25 | 1E+03 to 1E+04 |
| Tungsten | 2.11E+07 | 5.7 | 8E+03 to 1E+04 |
| Titanium | 2.35E+07 | 9.5 | 1E+03 to 1E+04 |

In some approaches, the specific modulus of the beam, (i.e., $E/\rho$) may be greater than about $2 \times 10^7$ m²/s². In some approaches, the beam 104 may have a coefficient of thermal expansion of less than about 25 parts per million (ppm)/° C., below about 10 ppm/° C., or, in some aspects, below about 6 ppm/° C.

The exciter 110 is a mechanism configured to deliver an impulse load to the beam 104. For example, the exciter 110 may impact the beam 104, causing vibration of the beam 104. In the embodiment depicted in FIG. 1, the exciter 110 is a mechanical clapper that is cantilevered from the first leg portion 124 of the base 102. The exciter 110 is positioned adjacent to the beam 104 on the base 102. The exciter 110 has a proximal end 111A that is coupled to the base 102 and a distal end 111B that is opposite the proximal end 111A. The distal end 111B of the exciter 110 includes a projection 112 that provides a contact surface for the actuating arm 116. In some approaches, the exciter 110 may be a metal wire having a diameter between about 0.01 inches and about 0.1 inches, and, in some aspects, between about 0.02 inches and about 0.06 inches. The exciter 110 may be made of any suitable material, for example, a metal such as spring steel or piano wire.

In the embodiment depicted in FIG. 1, the exciter 110 is actuated by the actuating arm 116 which is driven by the motor 118. In other embodiments, the exciter 110 may be actuated in other ways. For example, in one approach, the beam 104 may be self-excited by the dynamics of the environment and the deposition process itself. In another approach, a linear actuator such as a solenoid may actuate the exciter 110. In another non-limiting example, the vibration sensor 100 may use a servo motor, such as the motor 118, with the actuating arm 116 functioning as the exciter 110, where the actuating arm 116 directly impacts the beam 104. In some approaches, the exciter 110 may be self-actuated to directly impart an impulse to the beam 104. For example, the exciter 110 may not employ the actuating arm 116.

The motor 118 is coupled to the second leg portion 126 of the base 102. In some embodiments, the motor 118 is a servo motor that rotates the actuating arm 116 about the motor shaft axis 117. In other embodiments, the motor 118 may be any rotary or linear actuator that controls the position of or actuates the actuating arm 116. As configured in FIG. 1, the motor 118 rotates the actuating arm 116 about the motor shaft axis 117. The motor 118 operates the actuating arm 116 to bring the actuating arm 116 into and out of contact with the exciter 110.

The exciter 110 excites vibration in the beam 104 and delivers an impulse load to the beam 104 to cause the beam to vibrate (e.g., resulting in a vibrating beam 104). In the case of a mechanically impacting exciter (e.g., a mechanical clapper), a short impulse may be desired to prevent dampening of vibrations of the beam 104. In some approaches, the exciter 110 may be a mechanical clapper that is intermittently actuated to excite the beam 104, thereby causing the beam 104 to vibrate. In some approaches, the exciter 110 may be configured to elastically deflect upon being engaged by the actuating arm 116 of the motor 118. The actuating arm 116 is movable between a first position in which the actuating arm 116 engages the exciter 110 and a second position in which the actuating arm 116 does not engage the exciter. In one example, the motor 118 rotates the actuating arm 116 to move the actuating arm 116 from the first position where actuating arm 116 engages the exciter 110 to the second position where the actuating arm 116 does not). Thus, the actuating arm 116 may be in the first position at a point in a trajectory of the actuating arm 116 where the actuating arm 116 is in contact with the exciter 110, allowing the exciter 110 to accumulate elastic strain energy. The actuating arm 116 may subsequently be in the second position at other points in the trajectory of the actuating arm 116 where the arm is not in contact with the exciter 110, whereby the exciter 110 is released and allowed to create an impulse load in the beam 104.

Though the vibration sensor 100 of FIG. 1 uses the motor 118 with a wire as the exciter 110, the vibration sensor 100 may use any exciter 110 or device that periodically delivers instantaneous impulses to the beam 104.

The vibration monitor 120 is coupled to the second leg portion 126 of the base 102. In some approaches, the vibration monitor 120 is an acoustic monitor. The vibration monitor 120 may be disposed anywhere on the base 102 and, in some approaches, may even be separate from the base 102. When the vibration monitor 120 is an acoustic monitor, it may be positioned so as to maximize or otherwise increase the vibration signal of the beam 104.

The vibration monitor 120 is configured to detect vibrations generated by the beam 104. The signal from the vibration monitor 120 may be configured to monitor a frequency response of the beam 104. In some approaches, the signal from the vibration monitor 120 is configured to monitor the resonant frequency of the beam 104. The frequency response may be represented by the power spectrum of the beam 104. The vibration monitor 120 is positioned proximate to the beam 104. In some approaches, the vibration monitor 120 is a microphone and is configured to monitor sound waves generated by the vibrating beam. In other approaches, the vibration monitor 120 may be an optical, piezo-electric, or capacitance transducer. The vibration monitor 120 may be any device operable to convert displacement of the beam 104, such as via sound waves to an electrical signal. The electrical signal may be sent to the control interface 203 (shown in FIG. 10).

In some embodiments, an initial indication of an impulse delivered by the exciter 110 triggers the vibration monitor 120 to capture a vibration signal for a specified period of time (e.g., 10 seconds, 30 seconds, 1 minute, 2 minutes, 3 minutes, 4 minutes, 5 minutes, 10 minutes, 20 minutes, or any other suitable period of time) as the signal decays.

The vibration sensor 100 may be positioned proximate to a target object that is to be coated via a deposition process. In particular, the vibration sensor 100 may be positioned such that one or more of the first deposition surface 108A and the second deposition surface 108B receive a coating deposited via the deposition process. For example, one or more of the first deposition surface 108A and the second deposition surface 108B may be positioned in a spray path of the deposition process, such as in the spray path of a slurry deposition process. As such, the first and second deposition surfaces 108A, 108B receive a portion of the coating along with the target object during the deposition process. The vibration sensor 100 may then monitor the deposition process. The vibration sensor 100 may operate during at least a portion of the deposition process to perform such monitoring or, in some aspects after the deposition process (e.g., after one or more layers of coating are applied).

In operation, the motor 118 rotates the actuating arm 116 about the motor shaft axis 117, causing the actuating arm 116 to periodically actuate the exciter 110. When the exciter 110 is engaged by the actuating arm 116, the exciter 110 impacts the beam 104, causing vibration of the first tine 106A and the second tine 106B of the beam 104, wherein vibration at the resonant frequency has substantially higher amplitude.

Figure 6:
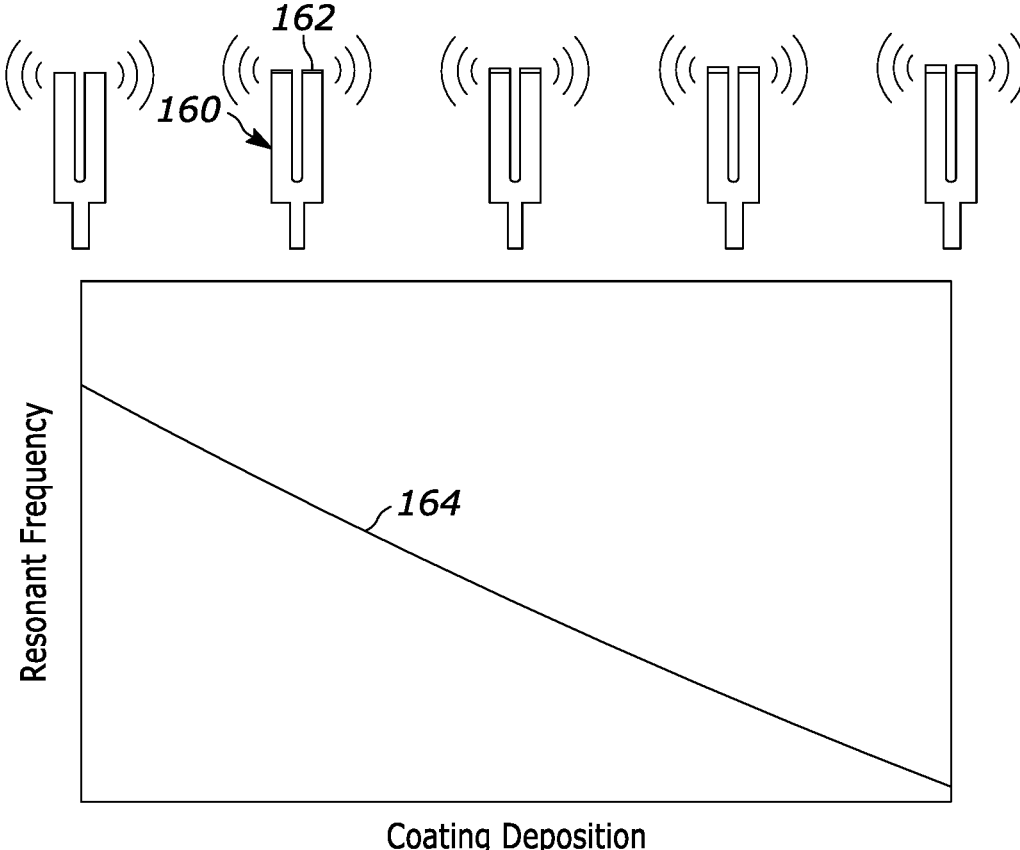
FIG. 6 comprises an exemplary graph depicting resonant frequency of a vibrating beam as a function of an amount of coating deposited via a deposition process.

During the deposition process, a coating is applied to the first tine 106A and the second tine 106B. In particular, the coating may be applied to the first deposition surface 108A of the first tine 106A and to the second deposition surface 108B of the second tine 106B, thereby adding mass to the first and second tines 106A, 106B. Adding mass to the first tine 106A and the second tine 106B induces a red shift (decreased frequency) of the resonant frequency of the beam 104. The resonant frequency decreases approximately in proportion to an amount of coating applied to the beam 104. FIG. 6 illustrates an exemplary relationship between the fundamental frequency and the amount of coating deposited onto the beam 104.

Because beam 104 is positioned proximate to the target object, the amount of coating applied to the beam 104 is indicative of an amount of coating deposited on the target object. In particular, the signal from the vibration monitor 120 allows tracking of the change in vibration of the beam 104 as a function of time (see exemplary data from the vibration monitor 120 in FIG. 7). In some aspects, the vibration monitor 120 is used to monitor a change in resonant frequency of the beam as a function of time. The vibration sensor 100 may then be used to determine a deposition rate (e.g., a mass deposition rate) for the coating deposited via the deposition process based on the change in resonant frequency of the beam 104.

In some embodiments, the vibration sensor 100 may further include a drying accelerator 129. The drying accelerator 129 may be a heater or a non-heat based dryer such as a convective dryer. The heater may be coupled to the beam 104. In some configurations, the heater may be coupled to one or more of the first tine 106A and the second tine 106B of the beam 104. The heater may be a resistance trace heater that is printed onto the beam 104, though, any suitable heating device and method may be used. In other approaches, the heater is not in direct physical contact with the beam 104. Examples include radiant and convection heaters. Though the drying accelerator 129 is depicted as an integral heater that is coupled to the beam 104, it is to be understood that the drying accelerator 129 may also be a detached dryer that is separate from the beam 104.

In operation, the heater may heat the beam 104 and coating to rapidly evaporate any liquids, such as carrier solvents, that are present in the deposited coating. Thus, the heater expedites drying of the coating and, in some approaches, may flash dry the coating on the beam 104. Accordingly, readings acquired by the vibration sensor 100 using a heated beam 104 are indicative of the dried coating mass. Without a heater, frequency readings of the vibration sensor 100 acquired after each layer of the coating is applied to the target object may evolve as the deposit dries, thus indicating the drying rate.

The vibration sensor 100 may also determine a drying rate for the coating deposited via the deposition process based on the change in resonant frequency of the beam 104.

In some approaches, a deposition rate and a drying rate may be measured by two separate beams 104. For example, a first beam with a heater can measure deposition rate while a second beam without a heater can measure the drying rate.

Turning briefly to FIG. 10, in some embodiments, the vibration sensor 100 may be in communication with a control interface and may be the vibration sensor 201 in communication with the control interface 203 in FIG. 10. The control interface 203 may further be in communication with a coating device 210. The coating device 210 may be any type of coating device that is operable to apply a coating to a target object. Suitable coating devices 210 include, for example, slurry, powder or thermal spray coaters, or similar. In this manner, the coating device 210 may use data acquired by the vibration sensor 201, such as deposition rate data and drying rate data, to adjust the deposition process. For example, the control interface 203 may adjust a flow rate of a coating slurry dispensed by the coating device 210 based on the deposition rate and/or drying rate from the vibration sensor 201. In another example, the control interface may adjust a duration of spraying, interval between consecutive coating passes, or other operations of the coating device 210 based on the deposition rate and/or drying rate information from the vibration sensor 201.

Figure 2:
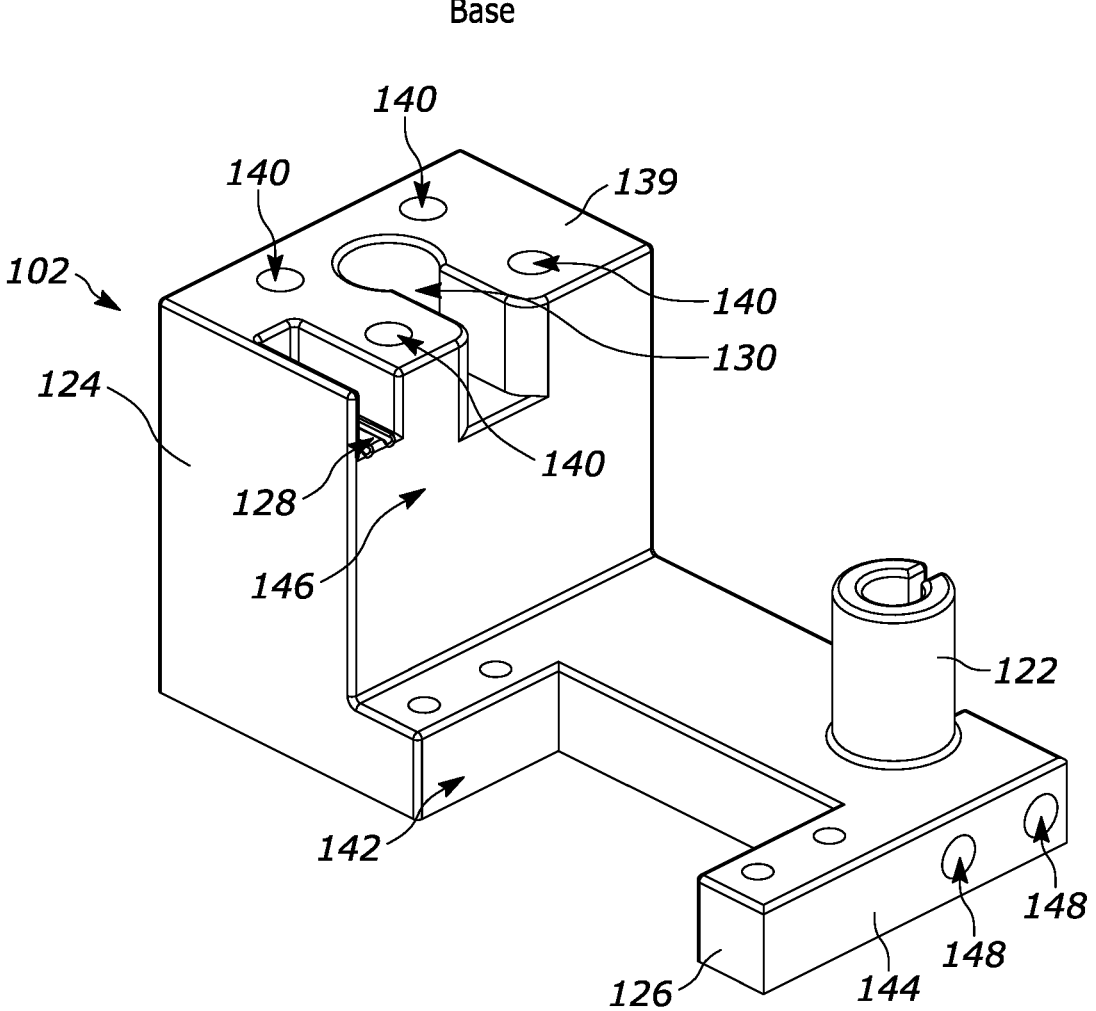
FIG. 2 comprises a perspective view of a base of the vibration sensor of FIG. 1.

Turning now to FIG. 2, the base 102 of the vibration sensor 100 of FIG. 1 is shown. The second leg portion 126 of the base 102 extends at an angle from the first leg portion 124. As configured in FIG. 2, the second leg portion 126 extends transverse to the first leg portion 124 such that the first leg portion 124 and the second leg portion 126 generally form an L-shape. The base 102 has an interior space 146 that is bounded in part by the first leg portion 124 and the second leg portion 126.

The first leg portion 124 includes a first slot 128 for receiving the exciter 110 (not shown in FIG. 2). The first leg portion 124 also includes a second slot 130 for receiving the beam 104 (not shown in FIG. 2). The first slot 128 and the second slot 130 extend through a first surface 139 of the base 102. The first slot 128 faces the interior space 146 and positions the exciter 110 within the interior space 146 of the base 102. The second slot 130 also faces the interior space 146 and positions the beam 104 in the interior space 146. The first surface 139 of the base 102 also includes one or more holes 140 for coupling the cover 114 to the base 102.

The second leg portion 126 includes a cut-out 142 that receives the motor 118 (not shown in FIG. 2). The second leg portion 126 also includes a support 122 for the vibration monitor 120 (not shown in FIG. 2). The support 122 extends from the second leg portion 126 into the interior space 146 of the base 102. As shown, the support 122 is cylindrical in shape with an opening extending therethrough. The vibration monitor 120 (not shown in FIG. 2) may be disposed in the opening. It is contemplated that the shape of the support 122 may be adjusted based on the shape of the vibration monitor 120. The support 122 positions the vibration monitor 120 adjacent to the beam 104. The second leg portion 126 also includes a second surface 144 disposed at a distal end of the second leg portion 126. The second surface 144 is transverse to the first surface 139 of the first leg portion 124. The second surface 144 includes one or more openings 148 for securing a mask (not shown in FIG. 2) for the beam 104 to the base 102. The mask for the beam 104 is illustrated and described with reference to FIG. 4.

Figure 3:
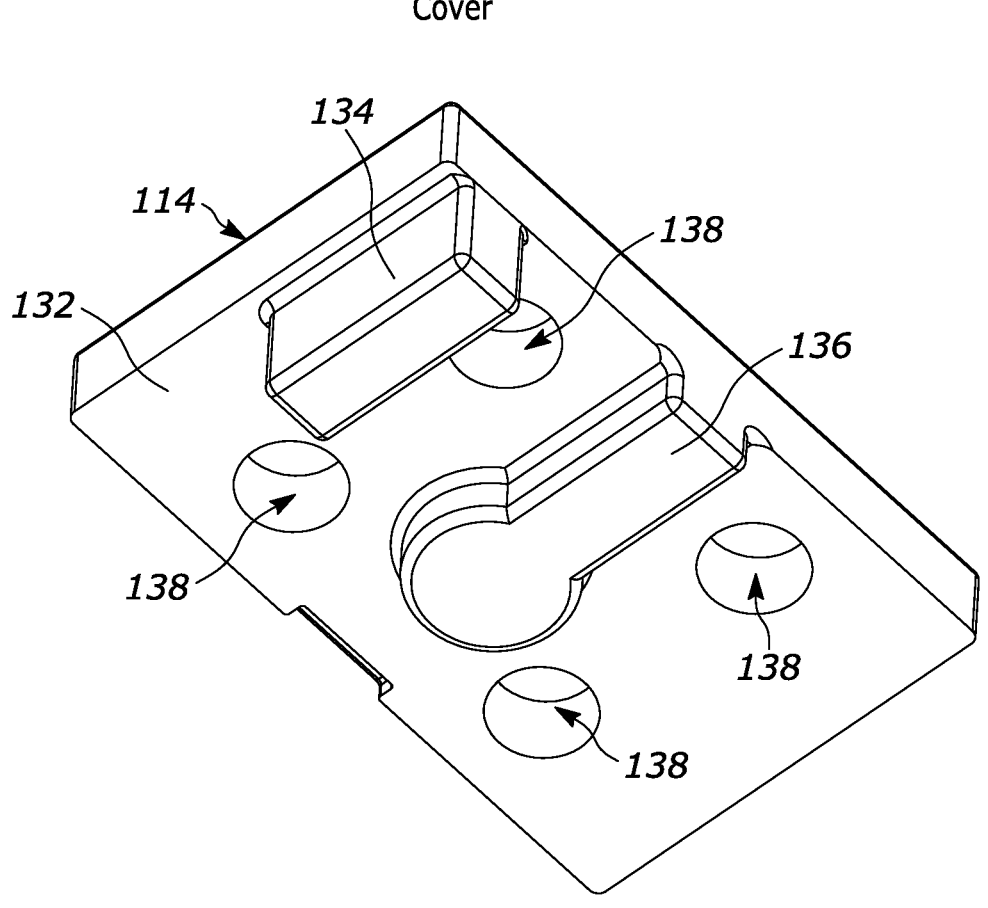
FIG. 3 comprises a bottom perspective view a top cover of the vibration sensor of FIG. 1.

FIG. 3 shows the cover 114 of the vibration sensor 100 of FIG. 1. The cover 114 includes a lower surface 132 having a first protrusion 134 and a second protrusion 136. The first protrusion 134 has a geometry that is complementary to a geometry of the first slot 128 such that the first protrusion 134 may be received by the first slot 128 when the cover 114 is positioned on the base 102. The second protrusion 136 has a geometry that is complementary to a geometry of the second slot 130 such that the second protrusion 136 may be received by the second slot 130 when the cover 114 is positioned on the base 102. One or more holes 138 extend through the cover 114. Any attachment mechanism, such as screws or nuts and bolts, may be used to couple the cover 114 to the base 102 via the one or more holes 140. In some approaches, the cover 114 may also be coupled to the base 102 via an adhesive.

Figure 4:
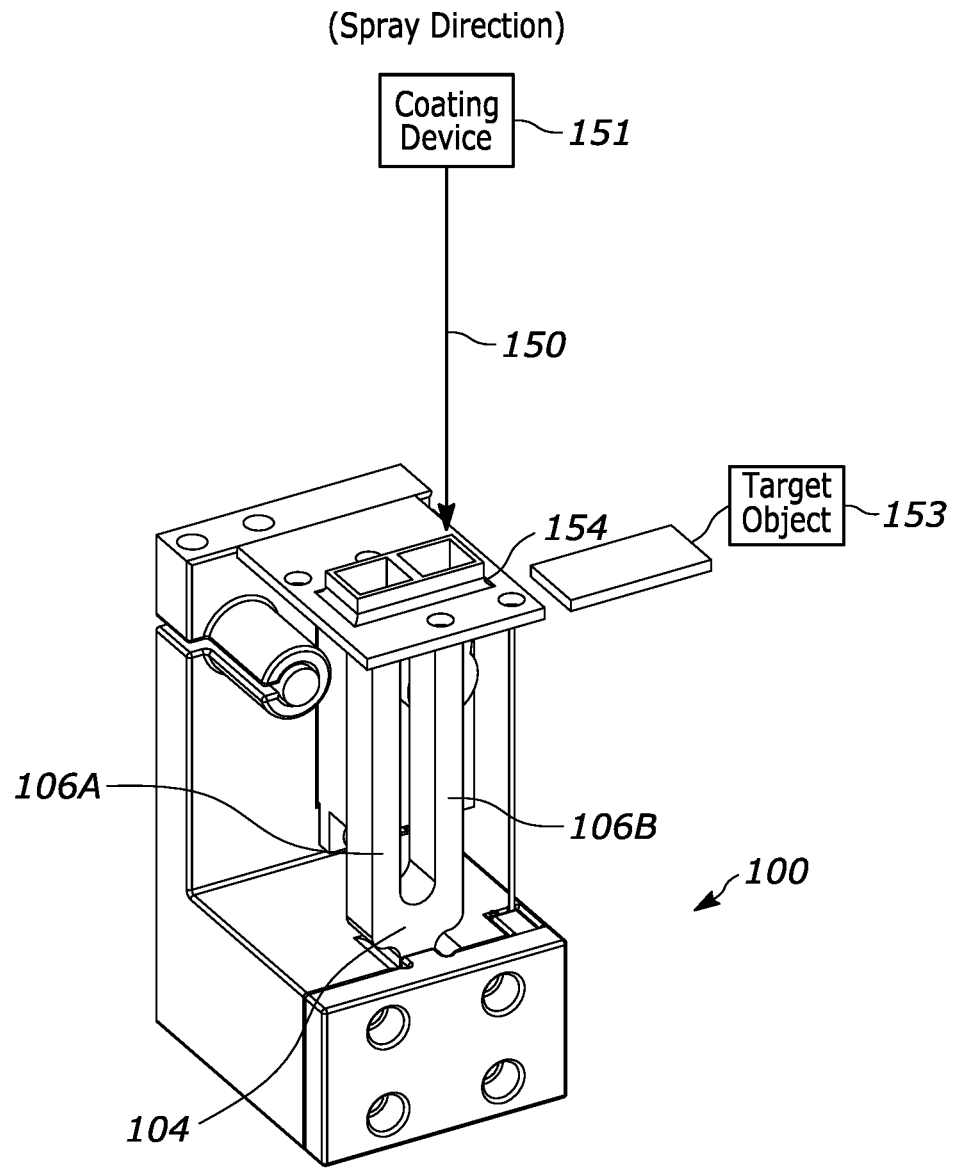
FIG. 4 comprises a perspective view of an exemplary installation of the vibration sensor of FIG. 1 with a mask.
Figure 5:
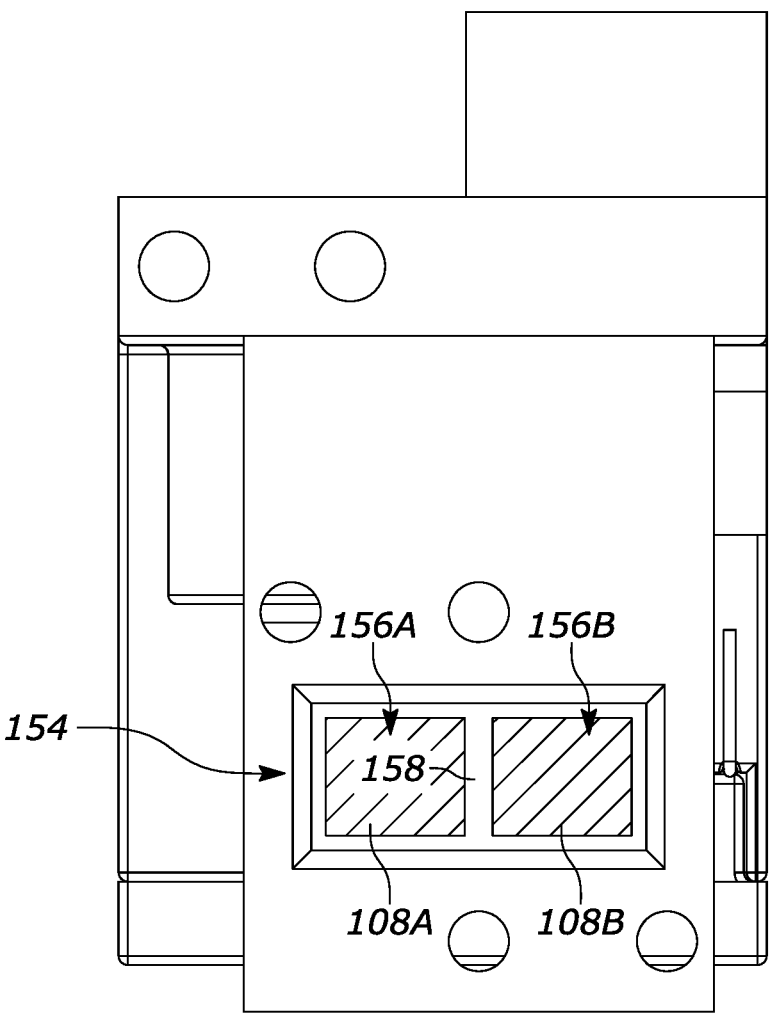
FIG. 5 comprises an enlarged plan view of a portion of the exemplary installation of FIG. 4, illustrating a mask portion of the vibration sensor.
Figure 11:
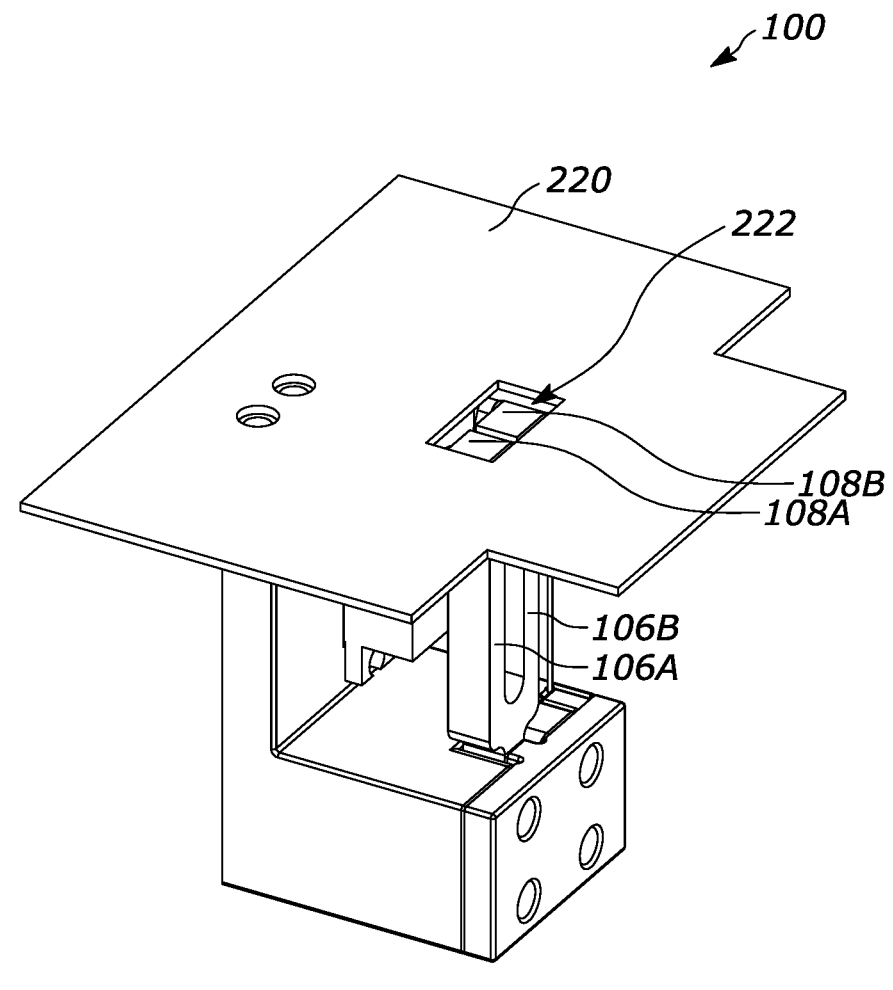
FIG. 11 comprises a perspective view of the vibration sensor of FIG. 1 including another embodiment of a mask.

FIGS. 4 and 5 illustrate an exemplary installation of the vibration sensor 100 depicted in FIG. 1 with a mask 154. An alternative embodiment of a mask for the vibration sensor 100 is depicted in FIG. 11. The vibration sensor 100 is incorporated into a deposition process for coating a target object 153. The deposition process includes a coating device 151, which may be any suitable device to provide a coating. The vibration sensor 100 and the target object 153 are positioned in at least a portion of a spray path 150 produced by the coating device 151. Though FIG. 1 depicts a spray deposition process it is to be understood that any other suitable deposition process may be employed, such as dip, brush, etc.

In some approaches, the first deposition surface 108A and the second deposition surface 108B may be positioned relatively co-planar with the target object, so that the first deposition surface 108A and the second deposition surface 108B receive substantially the same coating flux as the target object. Alternatively, the first deposition surface 108A and the second deposition surface 108B may be positioned in a different plane than the target object and a calibration factor may be used to translate sensor deposit to a corresponding target object deposit.

Optionally, the mask 154 may be an extension of or connected to the base 102 or fixed in an alternative way that does not include direct attachment to the beam 104. As shown in FIG. 5, the mask 154 includes a first opening 156A shaped to expose a portion of the first deposition surface 108A and a second opening shaped to expose a portion of the second deposition surface 108B. A mask bridge 158 is positioned between the first opening 156A and the second opening 156B. The mask bridge 158 limits deposition of coating between the first tine 106A and the second tine 106B of the beam 104.

FIG. 6 is an exemplary graph showing a resonant frequency of a vibrating beam 160 shifting as a coating 162 is deposited onto the beam. As shown, the resonant frequency of the vibrating beam 160 decreases in approximate proportion with the amount of coating deposited on the vibrating beam 160.

When excited, the vibrating beam 160 resonates at a particular frequency. A first harmonic frequency of the vibrating beam 160 is defined by the geometry and material of the vibrating beam 160. For a tuning fork geometry, the resonant frequency, f (Hz) may be approximated by the following equation (Formula 1):

$$f = \frac{k}{2\pi L^2}\sqrt{\frac{EI}{\rho A}} \approx \frac{0.16a}{L^2}\left(\frac{E}{\rho}\right)^{\frac{1}{2}} \qquad \text{Formula 1}$$

L=tine length (m)
a=prong thickness (m)
b=prong width (m)
A=tine cross-section $(m^2)$=a*b for a rectangular cantilever
k=wave number (mode) solutions≈3.52 for a rectangular cantilever (first harmonic)
E=Young's modulus $(N/m^2)$
I=second moment of area pf the beam $(m^4)$=$a^3b/12$ for a rectangular cantilever
ρ=density $(kg/m^3)$ When the coating 162 is deposited on the vibrating beam 160, a red shift (i.e., decreasing frequency) in the resonant frequency occurs. The frequency shift may be approximated by the following equation (Formula 2):

$$\Delta f \approx \frac{-2f}{L}\Delta L \approx \frac{-2f}{m_{tine}}\Delta m \qquad \text{Formula 2}$$

$m_{tine}$=mass of tine (kg)
Δm=change in mass of tine (kg) (i.e., mass of coating added to tine)

The curve 164 illustrates the frequency shift (Δf) as a function of a change in the mass of a tine (m) of the vibrating beam 160. Thus, as described above with reference to FIG. 1, a vibration monitor may monitor the frequency spectrum of the vibrating beam 160. The frequency shift of the vibrating beam 160 is indicative of an amount of the coating 162 that has been deposited on the vibrating beam 160.

Figure 7:
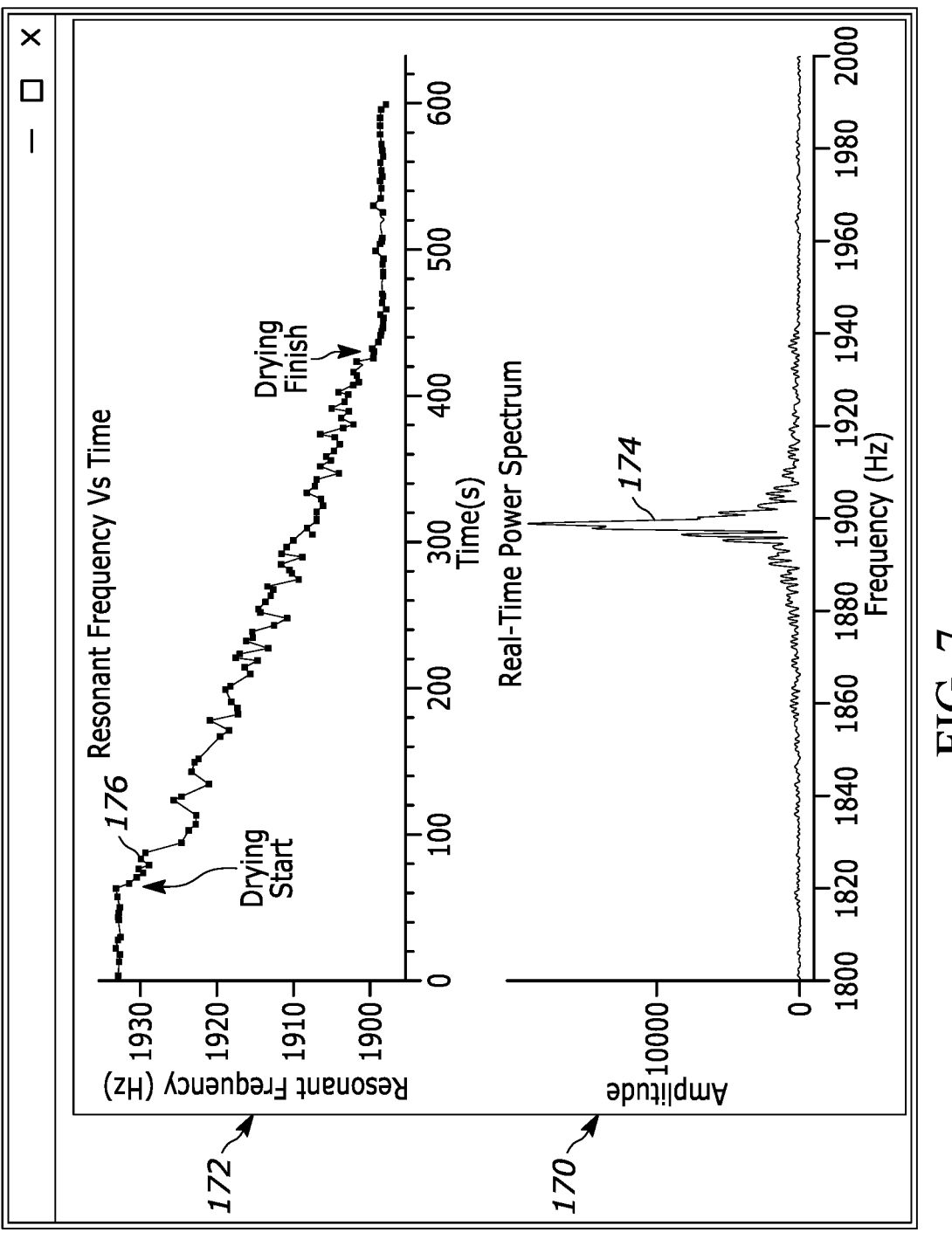
FIG. 7 comprises an exemplary graph of data acquired by a vibration sensor, in accordance with some embodiments.

FIG. 7 illustrates exemplary output data from the vibration sensor 100 of FIG. 1. In particular, the data was acquired using a microphone as the vibration monitor 120 during a slurry coating drying process. The data represents a frequency shift for a drying of a coating applied via a deposition process.

The graph 170 provides the frequency spectrum 174 of the beam 104 as triggered by the exciter 110 and measured by the vibration monitor 120 at a particular point in the drying process. In particular, the frequency spectrum 174 depicts the power spectrum derived from the electric signal generated via a vibration monitor 120, e.g., a microphone. Power spectrum analysis of the electrical signal generated by the vibration monitor 120 may be acquired using a fast Fourier transform (FFT) to break the electrical signal into its frequency spectrum. Frequency spectra, such as the example depicted by frequency spectrum 174, are acquired periodically throughout the coating drying process.

The graph 172 shows the evolution of resonant frequency 176 of the beam 104 as a function of time throughout a coating drying process. Referring to FIG. 12, the resonant frequency 176 can be a mode frequency (frequency with a maximum amplitude from a frequency spectrum). Alternatively, other characteristics of the resonant peak may be used to define the resonant frequency. For instance, the center frequency at full resonant peak width at half of the maximum amplitude (full width half maximum, FWHM) may also define the resonant frequency. Due to the relationship between resonance frequency shift of the beam 104 and mass added to the beam 104, the change in frequency over time is generally indicative of the coating drying rate. In the particular case of drying, the change in frequency over time decreases as the coating increases in shear strength, ultimately reaching an asymptotic value corresponding to the mass added to the beam 104.

Any suitable frequency from a frequency spectrum may be employed to determine the frequency shift for the beam and the methods described herein are not limited to the peak mode frequency or center frequency at FWHM amplitude.

Turning to FIG. 8, an exemplary method of monitoring a deposition process for a target object is provided. In a typical application (but not necessarily all of) the steps illustrated in FIG. 8 are carried out by a control interface, such as the control interface 203 in FIG. 10. The control interface may be in communication with a coating device, such as the coating device 210. Further, it is contemplated that the control interface 203 may be in communication with a vibration sensor, such as the vibration sensor 201 in FIG. 10 (e.g., the vibration sensor 100 in FIG. 1).

At block 180, the coating device applies a deposit onto at least a portion of a beam, such as a tuning fork, during at least part of a coating deposition process to produce a coated beam. For example, the beam or portions thereof may be positioned in a spray path of the coating deposition process such that the coating device receives one or more layers of a coating. The beam may include one or more coating deposition surfaces that receive a coating via the coating deposition process. Where the beam is a tuning fork, the coating deposition surfaces may be at the end of the tines of the tuning fork. For example, the coating device 210 may apply a coating to a portion of the beam 205 (e.g., the beam 104). The coating device 210 may apply a coating to the deposition surfaces 108A, 108B.

In some approaches, the beam is positioned proximate to the target object so that the coating received by the one or more coating deposition surfaces of the beam is representative of the coating applied to the target object. For example, one or more surfaces of the beam may be positioned co-planar with a surface of the target object that is to be coated.

At block 182, the sensor apparatus excites the beam, e.g., a tuning fork, inducing the beam or portions thereof to vibrate. For example, the vibration sensor 201 (e.g., vibration sensor 100) may excite the beam 205 (e.g., the beam 104). In some approaches, the sensor apparatus excites the beam during at least a portion of the coating deposition process. For example, the sensor apparatus may excite the beam periodically over the course of the coating deposition process. In other approaches, the sensor apparatus may excite the beam before and/or after the coating process, for example, after the coating deposition process is complete or after one or more layers of coating have been applied. In some approaches, the sensor apparatus may excite the beam after each layer in a plurality of coating layers has been applied to the target object. In some examples, the frequency of exciting the beam may be at least twice per coating pass to determine a coating thickness and/or a deposition rate, e.g., once before the coating is applied and once after the coating has dried. In this manner, it may be possible to determine whether the coating thickness is within desired limits. When the coating process includes 5 passes, the sensor apparatus may excite the beam 6 times, e.g., before the first pass and after each consecutive pass to determine the deposition rate. In other examples, the sensor apparatus may excite the beam 100s or 1000s of times to track the deposition process. The frequency of exciting the beam may be infinite when determining a drying rate. For example, the sensor apparatus may excite the beam 100s or 1000s of times to track the drying process. In some approaches, the frequency at which the sensor apparatus excites the beam may be between about 0.01 Hertz (Hz) and about 10 Hz and, in some aspects, may be between about 0.1 to about 1 Hz.

In some approaches, the sensor apparatus may excite the beam via an exciter, such as the exciter 110 in the vibration sensor 100 that is described with reference to FIG. 1. In other approaches, the beam may be excited by virtue of the sensor apparatus being positioned in a coating deposition process. That is, the ambient environment or the application of a coating to the beam (e.g., a pass of a spray nozzle over the beam) may excite vibration of the beam. In some cases, vibrations of the beam cause it to vibrate and generate a detectable acoustic signal.

At block 184, the sensor apparatus monitors a vibration response or, in some aspects, a frequency response of the vibrating beam. The sensor apparatus may monitor a resonant frequency of the beam. In some approaches, a control interface in communication with the sensor apparatus may convert the vibration response to a frequency response. Converting the vibration response into a frequency response may include performing a fast Fourier transform on the vibration response. The control interface may identify a resonant frequency based on the frequency response. Identifying a resonant frequency may include identifying a frequency corresponding to a mode or full-width at half-maximum frequency of a strongest peak in a frequency spectrum.

In some approaches, the vibration sensor 201 (e.g., the vibration sensor 100) may monitor the frequency response using the vibration monitor 209 (e.g., vibration monitor 120). In some cases, the frequency response is established using the CPU 211 of the control interface 203. In some approaches the frequency response includes a frequency spectrum that represents the signal intensity of an electric signal generated by an acoustic detector as a function of frequency. The control interface 203 may be configured to convert a vibration response of the vibration sensor into a frequency response and to identify and/or monitor a resonant frequency based on the frequency response.

The control interface, such as the control interface 203, may be configured to extract one or more frequencies from the frequency spectrum by performing a fast Fourier transform on the vibration response. For example, the control interface may extract a mode and/or a center frequency of FWHM amplitude from the frequency spectrum. The control interface may identify a frequency corresponding to a mode or a full-width at half-maximum frequency of a strongest peak in the frequency spectrum. However, it is contemplated that any suitable frequency may be extracted from the frequency spectrum for subsequent analysis by the control interface. For example, the control interface may extract any frequency that correlates with or corresponds to an amount (e.g., a mass) of coating applied to the beam.

At block 186, the control interface determines at least one of a deposition rate or a drying rate for the target object based on the frequency response of the vibration signal. For example, the control interface and/or the sensor apparatus may be calibrated to correlate a mass of coating applied to the beam to a frequency response (e.g., a resonant frequency shift) of the beam. The control interface 203 may determine at least one of a deposition rate or a drying rate for the target object. In some approaches, the control interface 203 also may be calibrated to correlate a mass of coating applied to the beam 205 (e.g., the beam 104) to a frequency response.

In some approaches, the control interface monitors the vibrating beam to acquire a vibration response over time.

For example, the control interface 203 may monitor the vibrating beam 205 (e.g., the vibrating beam 104) by receiving a signal from the vibration monitor 209 (e.g., the vibration monitor 120). The control interface may then perform a fast Fourier transform on the vibration response to extract a first frequency spectrum at a first point in time and a second frequency spectrum at a second point in time. The control interface may then process the first frequency spectrum to extract a first resonant frequency and the process the second frequency spectrum to extract a second resonant frequency. The control interface may then calculate a difference between the first resonant frequency and the second resonant frequency to determine a frequency shift that has occurred in the beam due to the coating applied via the coating deposition process. Based on calibration data, for example, that correlates the frequency shift of the beam with an amount of mass added to the beam, the control interface can determine an amount of mass that has been added to the beam between the first point in time and the second point and time. Dividing the added mass by the amount of time elapsed provides a mass deposition rate. The mass deposition rate is, in turn, correlated to the mass deposition rate for the target object, which can optionally be related to the coating thickness if the coating density is known.

It is contemplated that the control interface may perform similar operations to derive a drying rate for the target object. This is accomplished by calculating the frequency shift as a function of time after a coating pass, wherein the frequency shift continues increasing (decreasing frequency) as the coating continues to dry.

In cases where drying is not complete between successive coating passes, a heater or heating element can be used to rapidly dry the coating deposited onto the beam, so as to maintain an accurate real-time estimate of deposition rate even when the coating on the target object is not fully dry. Thus, in some approaches, the sensor apparatus may also dry at least a portion of the beam to obtain a dried coated beam. The control interface may determine the deposition rate of the dried coated beam based on the vibration response of the dried coated beam.

The control interface may apply a similar approach to determine a drying rate for a coating. When determining a drying rate, the time for a coating layer to dry is the elapsed time, Δt for a frequency shift to substantially stabilize. After a layer is deposited, the frequency decreases during drying. In some cases, a coating that is nearing drying completion may still contain carrier liquids that have not fully evaporated from the coating, though the frequency has stabilized, indicating that the deposit is sufficiently dry to elastically support the shear stress imposed on the coating by the vibrating beam.

In various application settings, a plurality of vibration sensors described herein, such as vibration sensor 201 (e.g., vibration sensor 100), may be employed to monitor a coating deposition process. One or more of the plurality of vibration sensors may be configured to monitor coating drying rates. Similarly, one or more of the plurality of vibration sensors may be configured to monitor coating deposition rates. In some cases, a single vibration sensor may be configured, without a drying accelerator, to monitor both coating deposition rates and coating drying rates.

In one example, a control interface may be in communication with a plurality of vibration sensors to monitor a coating deposition process for a target object. The size or shape of the target object may warrant more than one vibration sensor to capture drying and/or deposition rates. The plurality of vibration sensors may be positioned in any arrangement relative to the target object suitable to capture drying and/or deposition rates that are representative of rates for the target object.

Turning to FIG. 9, another exemplary method of monitoring a deposition process is provided. FIG. 9 illustrates an exemplary approach that leverages more than one vibration sensor to monitor both a deposition rate and a drying rate for a target object. In a typical application (but not necessarily all applications), the steps illustrated in FIG. 9 are carried out by a control interface, such as the control interface 203 in FIG. 10. The control interface may be in communication with a coating device, such as the coating device 210 in FIG. 10. Further, it is contemplated that the control interface may be in communication with a first vibration sensor and a second vibration sensor. In some approaches, the first vibration sensor and the second vibration sensor are the vibration sensor 201 in FIG. 10. The first vibration sensor includes a drying accelerator, whereas the second vibration sensor does not include a drying accelerator. The drying accelerator may be a convective dryer such as an air blower, a resistive trace heater, a radiant heater such as a heat lamp, or any suitable means of aiding the evaporation of the liquid carrier. The drying accelerator may be an integral heater that is coupled to the beam 205 or a detached dryer that is separate from the beam 205. In some approaches, the integral heater may be a resistive trace heater and the detached dryer may be at least one of a radiant heater or a convective dryer.

At block 190, the coating device applies a coating to at least two vibration sensors including first vibration sensor and a second vibration sensor. The first vibration sensor includes a drying accelerator, and the second vibration sensor does not include a drying accelerator. In particular, a coating device applies a coating to a beam of the first vibration sensor and to a beam of the second vibration sensor. The beams of the first vibration sensor and second vibration sensor are positioned proximate to the target object and are at least partially disposed in the path of a device that applies the coating to the target object. The drying accelerator of the first vibration sensor dries the coating that is applied to the beam or otherwise accelerates the evaporation of carrier liquid from the coating.

At block 192, the first vibration sensor and the second vibration sensor are excited, and the control interface converts the vibration signal to a frequency response. In some approaches, the first vibration sensor and/or the second vibration sensor may include an exciter that excites the coated beam. In other approaches, the deposition process itself may excite the beams of the first vibration sensor and the second vibration sensor.

At block 194, the control interface correlates a resonant frequency shift of the first vibration sensor to a deposition rate and correlates a resonant frequency shift of the second vibration sensor to a drying rate. Due to the accelerated drying of the coating applied to the first vibration sensor, a resonant frequency of the frequency response of the first vibration sensor corresponds to an added mass of coating (e.g., an amount of coating added, the coating free or substantially free of carrier liquids).

The methods, techniques, systems, devices, and the like described herein may be utilized, implemented and/or run on many different types of devices and/or systems. Referring to FIG. 10, there is illustrated a sensor system 200 that may be used for any such implementations, in accordance with some embodiments. One or more components of the sensor system 200 may be used to implement any system, apparatus or device mentioned above, or parts of such systems, apparatuses or devices, such as for example any of the above or below mentioned control circuits, user interfaces, sensor(s), databases, parts thereof, and the like. However, the use of the sensor system 200 or any portion thereof is certainly not required.

The sensor system 200 includes a vibration sensor 201 and a control interface 203. The sensor system 200 is configured to monitor a coating applied by a coating device 210. The vibration sensor 201 of the sensor system 200 includes physical components of the sensor system 200 including but not limited to a beam 205, an exciter system 207, and a vibration monitor 209. In some approaches, the vibration sensor 201 may be the vibration sensor 100 described with reference to FIG. 1. The control interface 203 includes a process controller 202, a central processing unit (CPU) 211, and a memory 204. The control interface 203 is configured to analyze one or more signals generated by the vibration monitor 209 of the vibration sensor 201 as well as controlling the exciter system 207.

The process controller 202 may send voltage or current signals to drive motors of the vibration sensor 201 and/or of the coating device 210 (e.g., a robotic spray arm or stage or for exciting the beam 205). The process controller 202 may also send voltage or current signals to control other aspects of a deposition process associated with the coating device 210, for example, to control flow and pressure regulators, turn valves on and off, etc. The CPU 211 may acquire signals from various sensors, such as the vibration sensor 201, process data, log data, and, in some aspects, may also send instructions to the process controller 202. The process controller 202 may be distinct from the CPU 211 and may have its own CPU to function.

The coating device 210 interacts directly with the beam 205 of the vibration sensor 201. The coating device 210 applies a coating to at least a portion of the beam 205 of the vibration sensor 201. The beam 205 may be associated with the exciter system 207. The exciter system 207 excites the beam 205 before, during, and/or after the deposition process so as to cause at least a portion of the beam 205 to vibrate. The control interface 203 controls the beam 205 and the exciter system 207. For example, the control interface 203 may include motor control to actuate a motor associated with the exciter system 207. The vibration monitor 209 then detects a vibration response of the beam 205 and generates one or more signals indicative of the vibration response. The control interface 203 is configured to analyze the vibration response detected by the vibration monitor 209. The CPU 211 and memory 204 of the control interface 203 may process and store the signals from the vibration monitor 209. The control interface 203 may be configured to analyze the vibration response of the beam 205 to determine a deposition rate or a drying rate. In some approaches, the control interface 203 may perform one or more of the methods described herein, such as the methods described with reference to FIG. 8 or FIG. 9.

The coating device 210 may include an optional feedback loop from the control interface 203 to the coating device 210. The feedback loop may enable automated or operator intervention to adjust one or more coating parameters based on information determined by the control interface 203.

The control interface 203 typically comprises one or more processors and/or microprocessors. The memory 204 stores the operational code or set of instructions that is executed by the control interface 203 to implement the functionality of the systems and devices described herein, parts thereof, and the like. In some embodiments, the memory 204 may also store some or all of the particular process data that may be needed for process logging. The memory 204 may include instructions executed by the control interface 203 to perform any of the analysis and control functions described herein, including but not limited to those described with reference to FIG. 1-9.

It is understood that the process controller 202 and/or processor may be implemented as one or more processor devices as are well known in the art. Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 204 is shown as internal to the sensor system 200; however, the memory 204 can be internal, external or a combination of internal and external memory Additionally, the system typically includes a power supply (not shown), which may be from a battery, including a rechargeable battery, and/or from an external source.

Generally, the control interface 203 and/or electronic components of the sensor system 200 can comprise fixed-purpose hard-wired platforms or can comprise a partially or wholly programmable platform. These architectural options are well known and understood in the art and require no further description here. The system and/or control interface 203 can be configured (for example, by using corresponding programming as will be well understood by those skilled in the art) to carry out one or more of the steps, actions, and/or functions described herein.

The user interface 208 may be used for user input and/or output display. The user interface is operatively coupled to the control interface 203. For example, the user interface 208 may include any known input devices, such one or more buttons, knobs, selectors, switches, keys, touch input surfaces, and/or audio input. Additionally, the user interface 208 includes one or more output display devices, such as lights, visual indicators, and/or display screens. to convey information to a user, such as but not limited to process status information, notifications, errors, conditions, and/or other such information. Similarly, the user interface 208 in some embodiments may include audio systems that can receive audio commands or requests verbally issued by a user, and/or output audio content, alerts and the like.

FIG. 11 depicts an exemplary installation of the vibration sensor 100 of FIG. 1 with a mask 220. The mask 220 is a plate having a window 222 disposed therein. When the mask 220 is installed on the vibration sensor 100, the mask 220 exposes both the first deposition surface 108A of the first tine 106A and the second deposition surface 108B of the second tine 106B. The mask 220 lacks the mask bridge 158 present in the mask 154 that is depicted in FIGS. 4 and 5. As such, the mask 220 may be suitable for deposition processes when the spray direction is at an angle relative to the deposition surfaces 108A, 108B.

FIG. 12 depicts exemplary analysis of a frequency spectrum to determine the resonant peak position using the mode frequency or the center frequency at FWHM. The control interface may be configured to carry out the analysis of the frequency spectrum depicted in FIG. 12. The frequency spectrum 228 has a substantially symmetric peak. The frequency spectrum 230 has an asymmetric peak.

On the frequency spectrum 228, the mode frequency 232 is the frequency with the maximum amplitude 250. The center frequency at FWHM 233 is the frequency corresponding to the center of the full width of the peak (see line 235) at half of the maximum amplitude 250 of the peak. Line 234 illustrates half of the maximum amplitude 250. Line 235 illustrates the full width of the peak at half of the maximum amplitude 250. The center frequency at FWHM 233 corresponds to the midpoint of line 235. On the frequency spectrum 228, which is substantially symmetric, the mode frequency 232 is approximately equal to the center frequency at FWHM 233.

On the frequency spectrum 230, the mode frequency 238 is the frequency with the maximum amplitude 252. The center frequency at FWHM 236 is frequency located at the center of the full width of the peak at half of the maximum amplitude 252 of the peak. Line 242 illustrates half of the maximum amplitude 252. Line 240 illustrates the full width of the peak at half of the maximum amplitude 252. The center frequency at FWHM 236 corresponds to the midpoint of line 240. On the frequency spectrum 230, which is asymmetric, the mode frequency 238 is different from the center frequency of the FWHM 236.

Further aspects of the disclosure are provided by the subject matter of the following clauses:

A sensor apparatus comprising: a beam having at least one deposition surface to receive a coating applied to an object during a deposition process; a vibration monitor that detects vibrations of the beam and output a signal indicative of a vibration response of the beam; and a processor to determine, based on the signal from the vibration monitor, at least one of a deposition rate or a drying rate of the coating applied during the deposition process.

The sensor apparatus of any preceding clause, wherein the beam is formed from a material having a coefficient of thermal expansion of less than about 25 ppm/° C.

The sensor apparatus of any preceding clause, wherein the beam has a quality factor greater than about 1000.

The sensor apparatus of any preceding clause, wherein the processor is to convert the signal from the vibration monitor to a frequency spectrum.

The sensor apparatus of any preceding clause, further including a drying accelerator.

The sensor apparatus of any preceding clause, wherein the drying accelerator is an integral heater that is coupled to the beam or a detached dryer that is separate from the beam.

The sensor apparatus of any preceding clause, wherein the integral heater is a resistive trace heater and wherein the detached dryer is at least one of a radiant heater or a convective dryer.

The sensor apparatus of any preceding clause, wherein the beam is a tuning fork including a first tine and a second tine.

The sensor apparatus of any preceding clause, wherein the first tine includes a first deposition surface and the second tine includes a second deposition surface, a space separating the first deposition surface from the second deposition surface.

The sensor apparatus of any preceding clause, wherein the vibration monitor is a microphone.

The sensor apparatus of any preceding clause, further including a mask proximate to the first deposition surface and the second deposition surface that limits deposition of coating on surfaces of the beam other than the first deposition surface and the second deposition surface.

The sensor apparatus of any preceding clause, further comprising: an exciter that delivers an impulse to the beam to cause the beam to vibrate, resulting in a vibrating beam.

The sensor apparatus of any preceding clause, wherein the exciter is a mechanical clapper which is intermittently actuated to excite the beam thereby causing the beam to vibrate.

The sensor apparatus of any preceding clause, further including a base including a first leg portion and a second leg portion, wherein the beam is cantilevered from the first leg portion, and wherein the exciter includes a motor that actuates an actuating arm, the motor and the actuating arm being coupled to the second leg portion.

The sensor apparatus of any preceding clause, wherein the beam is formed from one or more of fused quartz ($SiO_2$), aluminum, stainless steel, steel, silicon carbide, Invar alloy (Ni—Fe), tungsten, titanium, silicon nitride, silicon, or boron carbide.

A method comprising: applying a coating to at least a portion of a beam of a sensor apparatus during a coating deposition process to obtain a coated beam; exciting the coated beam such that at least a portion of the coated beam vibrates; monitoring a vibration response of the beam while the beam is vibrating; and determining at least one of a deposition rate or a drying rate of the coating deposited via the coating deposition process based on the vibration response.

The method of any preceding clause, further comprising: converting the vibration response into a frequency response; and identifying a resonant frequency based on the frequency response; wherein at least one of the deposition rate or the drying rate is determined based on a change in the resonant frequency as a result of the coating deposition process.

The method of any preceding clause, wherein converting the vibration response into a frequency response includes performing a fast Fourier transform on the vibration response.

The method of any preceding clause, wherein identifying a resonant frequency includes identifying a frequency corresponding to a mode or full-width at half-maximum frequency of a strongest peak in a frequency spectrum.

The method of any preceding clause, further comprising drying at least a portion of the beam to obtain a dried coated beam, and determining the deposition rate the coating based on the vibration response of the dried coated beam.

A method of monitoring coating deposition comprising: applying a coating to at least a portion of a first beam of a first sensor apparatus and to at least a portion of a second beam of a second sensor apparatus, the first beam including a drying accelerator; exciting the first beam; monitoring a first vibration response of the first beam; exciting the second beam; monitoring a second vibration response of the second beam; and determining a mass deposition rate based on a change in a resonant frequency of the first vibration response of the first beam and determining a drying rate based on the change in the resonant frequency of the second vibration response of the second beam.

A method of monitoring a deposition process comprising: receiving a first frequency spectrum for a vibrating beam at a first point in time during a deposition process, the vibrating beam disposed in a spray path of the deposition process; extracting a first resonant frequency of the vibrating beam from the first frequency spectrum; receiving a second frequency spectrum for the vibrating beam at a second point in time during the deposition process; extracting a second resonant frequency of the vibrating beam from the second frequency spectrum; and determining a deposition rate or a drying rate for a coating deposited via the deposition process based on a difference between the first resonant frequency and the second resonant frequency divided by a time interval between the second point in time and the first point in time.

What is claimed is:

1. A sensor apparatus comprising:

a beam having at least one deposition surface to receive a coating applied to an object during a deposition process;

a vibration monitor that detects vibrations of the beam and outputs a signal indicative of a vibration response of the beam;

a drying accelerator; and a processor to determine, based on the signal from the vibration monitor, at least one of a deposition rate or a drying rate of the coating applied during the deposition process.

2. The sensor apparatus of claim 1, wherein the beam is formed from a material having a coefficient of thermal expansion of less than about 25 ppm/° C.

3. The sensor apparatus of claim 1, wherein the beam has a quality factor greater than about 1000.

4. The sensor apparatus of claim 1, wherein the processor is configured to convert the signal from the vibration monitor to a frequency spectrum.

5. The sensor apparatus of claim 1, wherein the drying accelerator is an integral heater that is coupled to the beam or a detached dryer that is separate from the beam.

6. The sensor apparatus of claim 5, wherein the integral heater is a resistive trace heater, or the detached dryer is at least one of a radiant heater or a convective dryer.

7. The sensor apparatus of claim 1, wherein the beam is a tuning fork including a first tine and a second tine.

8. The sensor apparatus of claim 7, wherein the first tine includes a first deposition surface, and the second tine includes a second deposition surface, a space separating the first deposition surface from the second deposition surface.

9. The sensor apparatus of claim 8, further including a mask proximate to the first deposition surface and the second deposition surface that limits deposition of coating on surfaces of the beam other than the first deposition surface and the second deposition surface.

10. The sensor apparatus of claim 1, further comprising:

an exciter that delivers an impulse to the beam to cause the beam to vibrate, resulting in a vibrating beam.

11. The sensor apparatus of claim 10, wherein the exciter is a mechanical clapper which is intermittently actuated to excite the beam thereby causing the beam to vibrate.

12. The sensor apparatus of claim 10, further including a base including a first leg portion and a second leg portion, wherein the beam is cantilevered from the first leg portion, and wherein the exciter includes a motor that actuates an actuating arm, the motor and the actuating arm being coupled to the second leg portion.

13. The sensor apparatus of claim 1, wherein the beam is formed from one or more of fused quartz ($SiO_2$), aluminum, stainless steel, steel, silicon carbide, Invar alloy (Ni—Fe), tungsten, titanium, silicon nitride, silicon, or boron carbide.

14. The sensor apparatus of claim 1, wherein the sensor apparatus is configured to determine each of a deposition rate, a coating thickness, and a drying rate of the coating applied during the deposition process.

15. The sensor apparatus of claim 1, wherein the vibration monitor is configured to detect vibrations of the beam via at least one of an optical detector, a capacitance detector, a piezoelectric detector, and/or a strain detector.

16. A method comprising:

applying a coating to at least a portion of a beam of a sensor apparatus during a coating deposition process to obtain a coated beam;

exciting the coated beam such that at least a portion of the coated beam vibrates;

monitoring a vibration response of the coated beam while the coated beam is vibrating;

drying at least a portion of the coated beam to obtain a dried coated beam; and determining at least one of a deposition rate or a drying rate of the coating deposited via the coating deposition process based on the vibration response of the dried coated beam.

17. The method of claim 16, further comprising:

converting the vibration response into a frequency response; and identifying a resonant frequency based on the frequency response;

wherein at least one of the deposition rate or the drying rate is determined based on a change in the resonant frequency as a result of the coating deposition process.

18. The method of claim 17, wherein converting the vibration response into a frequency response includes performing a fast Fourier transform on the vibration response.

19. The method of claim 17, wherein identifying a resonant frequency includes identifying a frequency corresponding to a mode or full-width at half-maximum frequency of a strongest peak in a frequency spectrum.

20. The method of claim 16, comprising determining each of a deposition rate, a coating thickness, and a drying rate of the coating applied during the deposition process.

21. The method of claim 16, wherein monitoring a vibration response of the coated beam while the coated beam is vibrating comprises detecting vibrations of the coated beam via at least one of an optical detector, a capacitance detector, a piezoelectric detector, and/or a strain detector.

22. A method of monitoring coating deposition comprising:

applying a coating to at least a portion of a first beam of a first sensor apparatus and to at least a portion of a second beam of a second sensor apparatus, the first beam including a drying accelerator;

exciting the first beam;

monitoring a first vibration response of the first beam;

exciting the second beam;

monitoring a second vibration response of the second beam; and determining a mass deposition rate based on a change in a resonant frequency of the first vibration response of the first beam and determining a drying rate based on the change in the resonant frequency of the second vibration response of the second beam.

23. The method of claim 22, comprising further determining a coating thickness of the coating applied during the deposition process.

24. The method of claim 22, wherein monitoring the first vibration response and/or the second vibration response comprises detecting vibrations of the respective beam via at least one of an optical detector, a capacitance detector, a piezoelectric detector, and/or a strain detector.

* * * * *